(12) United States Patent
Cyrell (10) Patent No.: US 6,530,546 B1
(45) Date of Patent: Mar. 11, 2003

(54) CABLE MOUNT

(75) Inventor: Alexander Cyrell, Paradise Valley, AZ (US)

(73) Assignee: Omnimount Systems, Inc., Phoenix, AZ (US)

( * ) Notice: Subject to any disclaimer, the term of this patent is extended or adjusted under 35 U.S.C. 154(b) by 0 days.

(21) Appl. No.: 09/558,364

(22) Filed: Apr. 25, 2000

(51) Int. Cl.[7] .......................... F16L 3/08; F16M 11/00; F16M 13/00; A47F 7/00; A47H 1/10
(52) U.S. Cl. ...................... 248/70; 248/125.2; 248/317
(58) Field of Search ............................ 248/125.2, 320, 248/328, 329, 332, 317, 353, 70; 254/332, 369, 223, 237, 262; 249/492

(56) References Cited

U.S. PATENT DOCUMENTS

| | | | |
|---|---|---|---|
| 640,049 A | 12/1899 | Terry et al. ................. 256/42 |
| 711,651 A | * 10/1902 | Andrew ..................... 188/82.2 |
| 870,944 A | 11/1907 | Fish ........................ 211/119.15 |
| 2,429,590 A | 10/1947 | Ames ....................... 211/119.15 |
| 2,496,249 A | 1/1950 | Farr ............................ 254/222 |
| 2,947,516 A | * 8/1960 | Jackson ...................... 254/333 |
| 3,232,568 A | * 2/1966 | Lennon ......................... 248/67 |
| 3,416,763 A | 12/1968 | Moreno ........................ 24/68 R |
| 3,811,655 A | * 5/1974 | Foster ......................... 254/161 |
| 4,354,667 A | * 10/1982 | Svendsen .................... 254/332 |
| 4,510,651 A | * 4/1985 | Prete ............................. 24/68 |

* cited by examiner

*Primary Examiner*—Anita King
*Assistant Examiner*—Amy J. Sterling
(74) *Attorney, Agent, or Firm*—Gallagher & Kennedy, P.A.; Thomas D. MacBlain (57) ABSTRACT

An anchor for a cable used to support an object. The anchor is adapted to be mounted to any substantially flat surface from which the user desires the object to be mounted, e.g. a wall, ceiling or floor. A rotatably mounted shaft is secured to the cable end. A pivotal bracket supports the shaft. Both the shaft and the bracket can be secured at desired angular dispositions so that the angle at which the cable extends from the anchor can be adjusted. A slotted cover shields from view operative mechanical elements of the mount, but permits the run of cable to extend from the anchor at a desired angle.

21 Claims, 7 Drawing Sheets

CABLE MOUNT

FIELD OF THE INVENTION

This invention relates to an apparatus for mounting cables. Particularly, the invention is directed towards such mounting apparatus as used in a residential, industrial or commercial application for the purposes of supporting objects from or securing objects to a wall, ceiling or other surface by a cable.

BACKGROUND

It is frequently desired to mount objects from walls or ceilings. One way of accomplishing this type of mounting is to attach one or more cables, guy wires or other support lines to the object. One end of the cable must be firmly attached to a surface such as a wall or ceiling. An eyebolt or the like is often used with a loop formed in the end of the cable, wire or line. This combination can be unsightly and insecure since with just one point of threaded connection into the structure, the eyebolt is susceptible to coming loose, for example, by being rocked back and forth and thus loosened from the supporting structure.

Frequently, the desired location of the object necessitates less than optimal connection with the wall or ceiling. Furthermore, architectural design elements featuring wall sections that depart from vertical, or ceiling sections that depart from horizontal also necessitate less than optimal connection with the wall or ceiling. The cable support should permit the cable to extend away from the support surface at any desired angle to accommodate variability in the location of the mounted object and to accommodate mounting surfaces that depart from vertical or horizontal. The difficulty of mounting to a wall or ceiling can be exacerbated by the weight of the object and a desire to minimize shear across and abrasion of the cable. Correct angular positioning of the run of cable from mounting surface to supported object can avoid contacting the cable with, and bending it around a part of either its anchor or other objects.

Most rigging and cabling techniques rely on the crimping of ferrules onto the cable as a means to form a loop or attaching a standard fitting. The crimping process is usually done with specialized, usually hydraulic equipment "at the factory." Special hand crimping tools are available but not commonly so. They are awkward to use on a ladder particularly when an The installer must push the tool's handles together at the same time as pulling a cable into tension.

There exists some non-traditional type fittings that do allow some on-site adjustability. Some incorporate a collet and sleeve compression arrangement, some have barbs or teeth that grip the cable. These non-traditional fittings are not readily available, are costly and are often viewed as inadequately field-proven.

Preferably, a surface mounted anchor should be as visually pleasing as possible. However, the objectives discussed above are particularly difficult to realize in a cable anchor that is not a visually intrusive addition to the architectural environment in which it is used. Furthermore, architectural features may constrain the point at which a cable anchor can be secured. The anchor may need to be fastened into subsurface uprights or beams. Here again, maximum adjustability of the angle at which the cable runs without sacrificing the security of the mounting or the appearance of the anchor is much to be desired.

SUMMARY OF THE INVENTION

In accordance with the present invention, a cable anchor is provided that is readily adjusted for the extension of a cable (or wire, cord or other line) in any of numerous directions away from the anchor. One or more of the anchors and attached cables can be the principal support for the object or they can be secondary support acting in concert with a primary support such as a bracket, shelf or frame type of support. For example, the cable anchor of the invention can, with its attached cable, be the primary means of hanging an object from a ceiling or overhang, and on the other hand, the anchor and its cable may be used to keep a television from sliding off of supporting shelf in, say, a hospital room.

The cable connection is pivotal about two axes to accommodate the various directions in which the cable can be extended. Unlike the eyebolt, which has only the single point of attachment into a mounting surface, the anchor of this invention provides two attachment points by two bolts securing it stably to the mounting surface. Thus, it provides better load distribution and significantly increased capability for much higher load bearing at the mounting surface. Because it has a surface bolted flat against the mounting surface and bolted there by the two bolts, it is not susceptible to being rocked back and forth such that the bolts will be loosened.

The present invention provides an apparatus for mounting objects that affords flexibility and ease of use and placement by allowing full adjustability of the angle at which a cable extends from an anchor at the same time being connected stably to a support surface and having an aesthetically pleasing, unobtrusive appearance. The flexibility and ease of use is not limited to flexibility of placement and adjustability of cable angle however. The anchor of the present invention differs from the traditional cable and rigging methodologies mentioned in that both the desired length of the cable and its ability to be installed in tension is easily managed at the installation site. The cable anchor according to this invention facilitates ease of installation by requiring only that a small hex key be used to apply a tightening force via a set screw to a point along the cable length. The ease of tightening the cable to the surface mounted anchor offers unique installation advantages. In an actual installation, this means that one hand can be free to apply tension and support to a cable or to adjust the vertical height of the object being supported by the cable. In other words, one person, using one hand, has the freedom to pull the cable and apply either tension, vertical height adjustment or both, related to positioning the object being supported, while the other hand can simultaneously turn the hex key, and with normal force applied to only one of three set screws, secure the cable in place anywhere along its length. When it is executed on a ladder, this is much safer from a balance and stability point of view. Using a manual crimping tool on the other hand, one person ordinarily could not accomplish this. It would be extremely difficult or impossible to hold the ferrule in place, pull tension on the cable and push the manual crimp tool handles together all at the same time.

As used herein, "cable" is meant to encompass a multi-strand wire cable, coated or uncoated, a guy wire, a single strand wire or a cord or flexible elongate member of any kind suitable to support an object. The cable anchor of the present invention provides for flush mounting on a wall or ceiling or even a subsurface member. Additionally, a cover screens the mechanical connecting parts of the mounting apparatus from view and provides an unobtrusive, attractive outer appearance.

The apparatus of a preferred embodiment of the invention comprises a pivotal U-shaped mounting base or bracket that supports a pivotal shaft. One end of the mounting cable connects to the shaft. Preferably, it passes through a cable passage in the shaft. In the preferred embodiment, the cable passes through a passage bored along a diameter of the shaft. It then passes through and around an anchor-block. The cable is threaded through one and then back through another of two substantially parallel anchor-block passages, then through another passage through the shaft. Once the cable has been properly tensioned with an appropriate tool, set-screws mounted in the anchor-block securely hold the cable in place. The anchor-block is pulled tightly against the shaft.

The use of set screws as a means of securing aircraft type cable is known and accepted. It is frequently used in race cars for example, as a means of securing control cables for accelerator linkage and brake cabling. It is believed not to have previously used in the manner of this invention, however.

In addition, what is believed a particularly unique feature in the present invention is the use of the three set screws and a loop back feature. Collectively, the set screws when properly tightened, provide redundancy and bring the point of attachment up to or beyond the break strength of the cable itself. Typically crimped ferrules are rated to 70% of the maximum cable strength. The cable anchor loop back feature of this invention, in and of itself, contributes to the holding power of the anchor block. The cable, looping back on itself, creates friction interference, engaging an anchor block through which it is threaded. The security is enhanced by the third set screw in the anchor block which is deliberately positioned after the loop.

The pivotal shaft provides one degree of freedom within which the mounting cable can rotate, i.e. in a plane substantially perpendicular to the rotational axis of the pivotal shaft. In addition, the base or bracket is rotatable about a hole that accepts a first one of the mounting bolts or screws. An arcuate slot centered on the hole receives the further bolt or screw to fix the base or bracket in fixed angular position on the support surface. The combination of the slot and mounting bolt provides an additional degree of rotational freedom allowing the pivotal shaft to be aligned substantially perpendicular to the run of the cable to the mounted object, so that the cable supports the object without any force being directed against the cable's side, but rather, along its length. By preventing forces directed laterally to the cable, shear on the cable and abrasion of the cable is eliminated or minimized. Such weakening as results from flexure is eliminated or substantially reduced.

The outer cover for the cable anchor of the invention preferably is slotted to allow the cable to pass through it in any of a number of directions without interference and has internal fingers that mesh with mounting holes on a portion of the mounting base. This engagement securely holds the cover and also ensures that the slot is appropriately aligned with the point of affixation of the mounting cable to the underlying shaft. The cover slot permits passage of the cable at any angle through a 90° range of angles afforded by the pivotal mounting of the underlying shaft to which the cable is secured. A further 90° of angular variability is afforded to the cable run by the cover being adapted to be turned 180° and mounted. By virtue of this, its slot can extend in either of two opposite directions to allow passage of the cable in the desired direction.

The above and further features and advantages of the invention will be more fully understood from the following detailed description of a preferred embodiment when taken in consideration with the accompanying drawings.

DESCRIPTION OF THE DRAWING

FIGS. 2(*a*) and (*b*) are front and fragmentary side elevation views of the mounting cable.

FIGS. 11(*a*) through 11(*d*) are perspective views of the mount of FIG. 1 illustrating various alignments of the cable and the cover.

DETAILED DESCRIPTION OF PREFERRED EMBODIMENT

Figure 1:
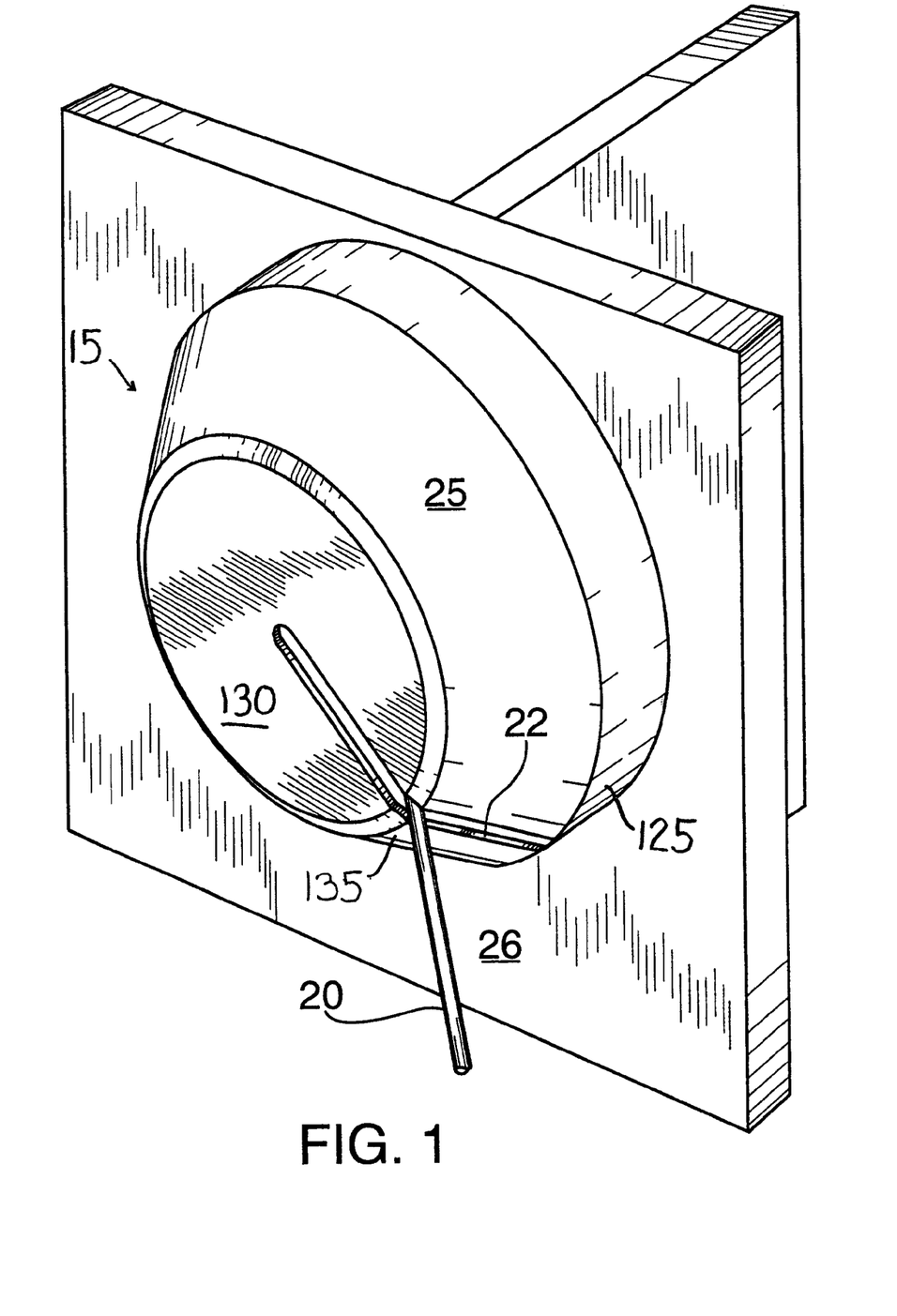
FIG. 1 is a perspective view of the anchor of the present invention and shows a portion of the mounting cable extending from the anchor.

As shown in FIG. 1, the cable anchor 15 is typically flush-mounted to the desired surface—the "mounted-on" surface 26. From it extends a cable 20 attached at its remote end to an object to be mounted or supported. One, two or more such anchors can be used to support the object in space.

Figure 3:
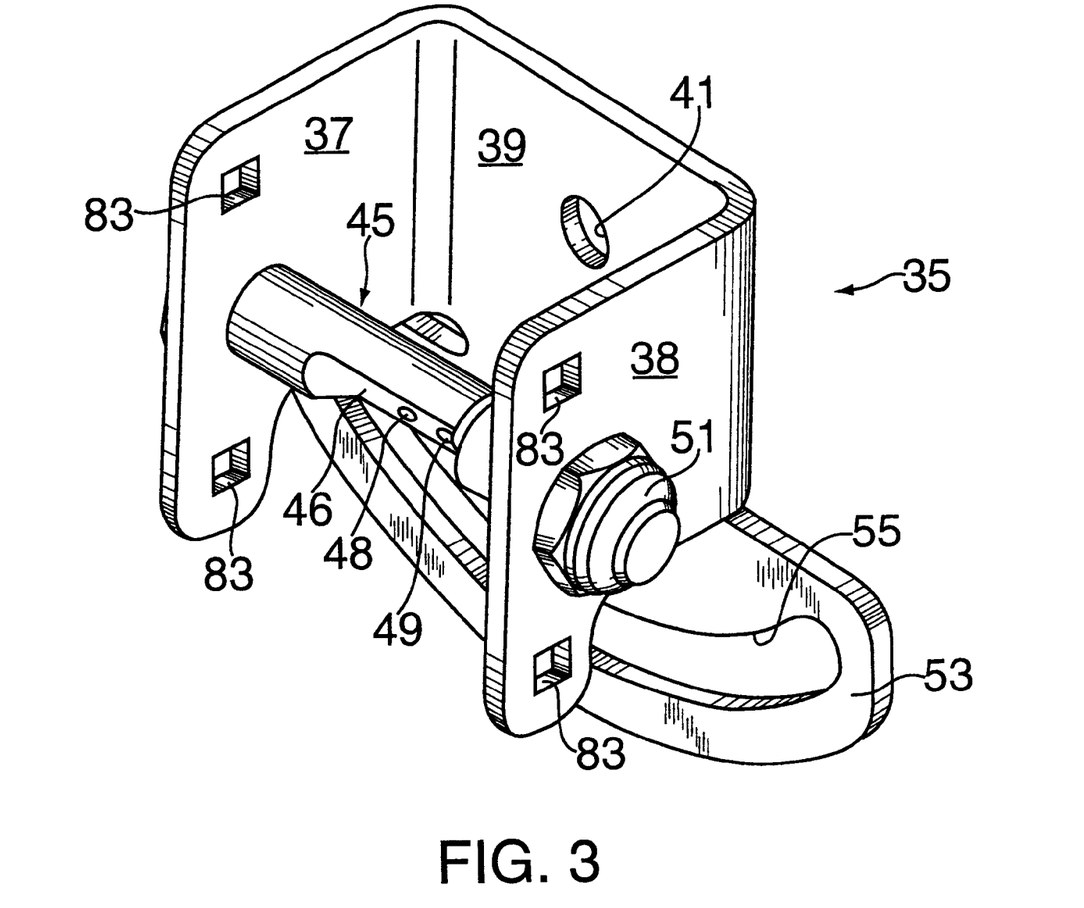
FIG. 3 is a perspective view of a U-shaped bracket and an attached shaft for securing the cable.
Figure 7:
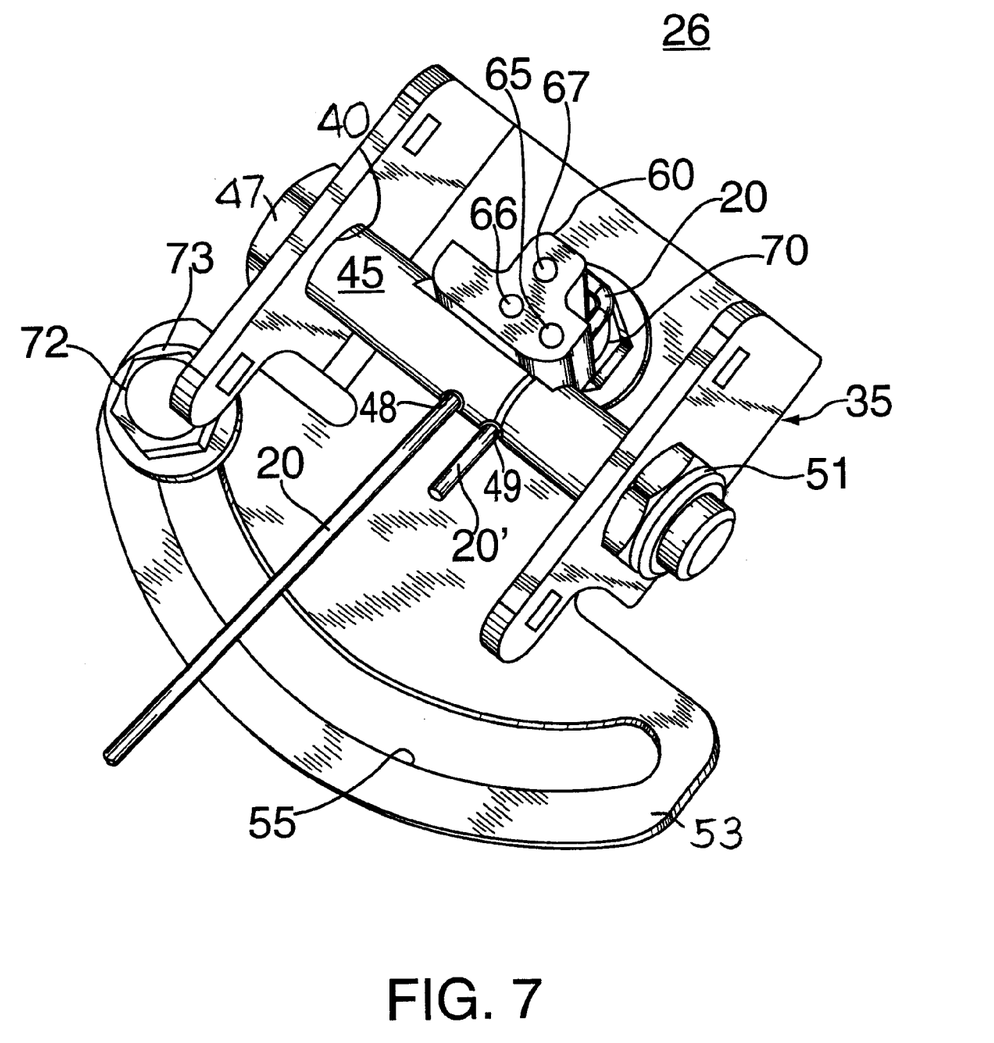
FIG. 7 is a perspective view of the complete mounting provisions of the cable anchor of FIG. 1.

As illustrated in FIG. 3, a mount 35 has a pair of ears 37 and 38 joined by a base 39. The base 39 has a mounting hole 41 by which the cable mounting apparatus is bolted, screwed or otherwise secured to the supporting ceiling or wall or, when appropriate, floor or other surface. Each of the ears 37 and 38 has shaft-receiving holes 40 for mounting a cable shaft 45. As shown in FIGS. 3 and 7, the cable shaft 45 is preferably a bolt with a head 47 and lock nut 51. Surfaces of the shaft-receiving holes 40 serve as bearings for the shaft 45, which is rotatable unless secured in place by tightening of the lock nut 51. Other more complex shaft mounting and bearing arrangements may be used, if desired.

A cable 20 (FIG. 7) attaches to the cable shaft 45. The cable shaft 45 has a pair of parallel cable passages 48 and 49 bored in substantial alignment with the diameter of the cable shaft 45. These cable passages 48 and 49 are substantially perpendicular to the rotational axis of the cable shaft 45. The cable 20 passes through the passage 48. An anchor-block 60 receives the cable 20 where it emerges from the passage 48.

Figure 4:
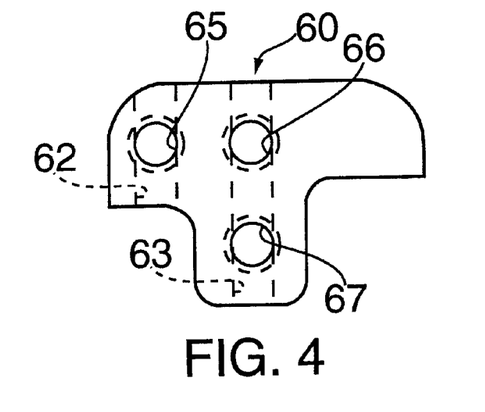
FIG. 4 is a top plan view of an anchor-block for use with the shaft of FIG. 3.
Figure 5:
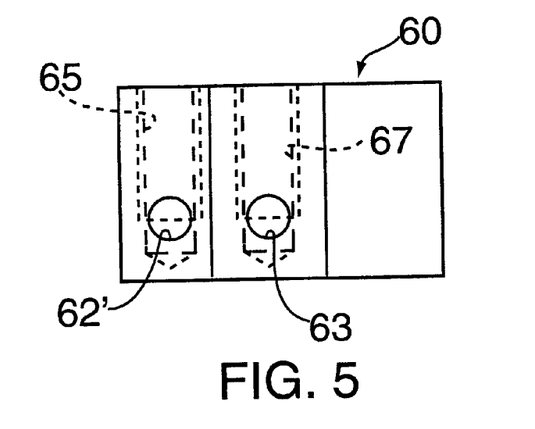
FIG. 5 is a front elevation view of the anchor-block of FIG. 4.
Figure 6:
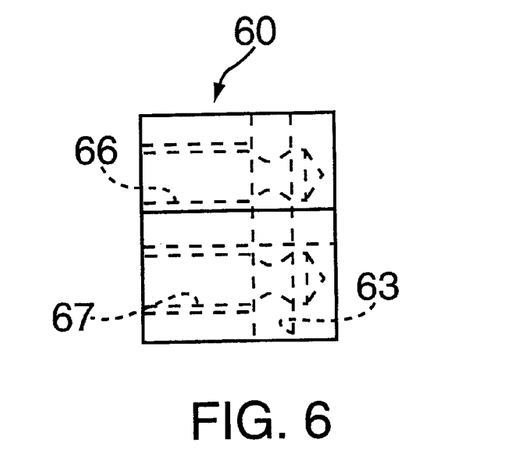
FIG. 6 is a side elevation view of the anchor-block of FIG. 4.

Best illustrated in FIGS. 4–6, in this preferred embodiment the anchor-block 60 is substantially T-shaped. It has one anchor-block passage 63 bored through the vertical or stem portion of the T-shape and another anchor-block passage 62 bored through the cross-bar portion of the T-shape substantially parallel to passage 63. Two threaded set-screw passages 66 and 67 extend from the surface of the anchor-block into the anchor-block passage 63. One further threaded set-screw passage 65 extends from the surface of the anchor-block 60 into the anchor-block passage 62. Set-screws (not shown) are adapted for tightening with a hex wrench or Allen wrench and are disposed within each set-screw passage 65, 66 and 67. The cable extends through the passage 48 in the shaft 45, through the passage 63 in the anchor block, it loops back, enters passage 62 in the anchor block and through passage 49 in the shaft 45.

The base 39 of the mount 35 preferably has a lower portion 53 containing an arcuate slot 55. The slot 55 is adapted to receive a locking screw or bolt (not shown). The locking screw or bolt fixes the mount in place at a desired angle of rotation about a bolt or screw extending through the mounting hole 41.

Using an appropriate tool (not shown) at the emerging end 20' of the cable 20, the cable 20 is gripped and pulled tight or tensioned and the three set-screws are tightened onto the cable 20 through the set-screw passages 65, 66 and 67. The cable is in frictional engagement with the anchor block 60 where it emerges from the passage 63 and reverses direction to enter the passage 62. After tensioning of the cable 20, the anchor-block 60 rests firmly against the flat 46 of the cable shaft 45. The rotatability of cable shaft 45 and the mount 35 allows the run of the cable 20 to be adjusted in three dimensions.

Figure 2A:
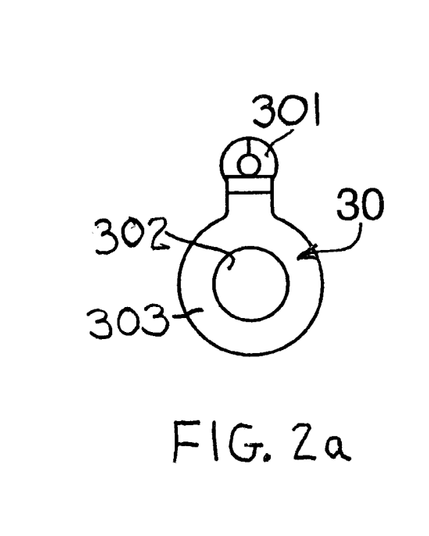
Figure 2B:
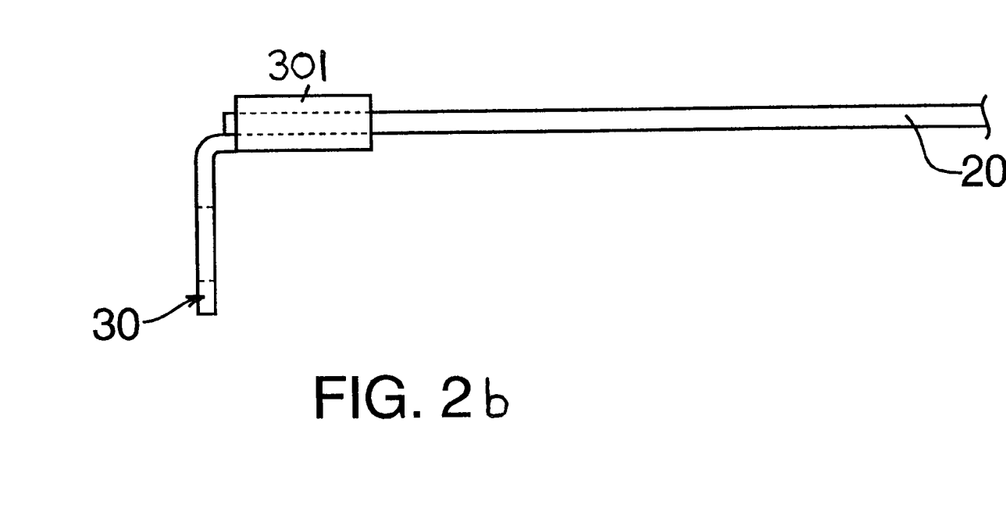

FIGS. 2(a) and 2(b) illustrate one exemplary and relatively simple provision for use in securing the cable to the supported object. At its end, the cable 20 has an eye 30 securely connected to it as by crimping or welding of a ferrule 301. An opening 302 formed in a perpendicularly extending tab 303 is provided to receive a mounting screw or bolt (not shown), for example, connected in turn to the mounted object (again not shown). Other provisions for attachment of the cable to the supported object may be used without departure from the present invention.

The pivotally adjustable mounting of the cable shaft 45 allows rotation of the cable 20 in a plane perpendicular to the rotational axis of the cable shaft 45. The slot 55 allows that plane to be swept through a range of angles and fixed in place. These two adjustments allow the cable mounting apparatus to be set-up so that the cable 20 only experiences forces substantially along its length. This permits shear and abrasion of the cable 20 to be substantially reduced or eliminated. This is true with respect to objects secured by the cable in almost any location with respect to the mount. The central bolt and the bolt through the slot 55 hold the anchor fast against the surface of the supporting structure, preventing rocking as might otherwise occur with movement of the cable, and providing two points of connection to the surface of the supporting structure.

The cable mount can include a cover 25. This cover 25 shields the mounting provisions from view and includes a slot to permit the cable 20 to pass through the cover 25 in any one of the directions permitted by the interior mounting provisions. Just about any exterior shape can be chosen for the cover 25 constrained only by aesthetic judgment.

Figure 8:
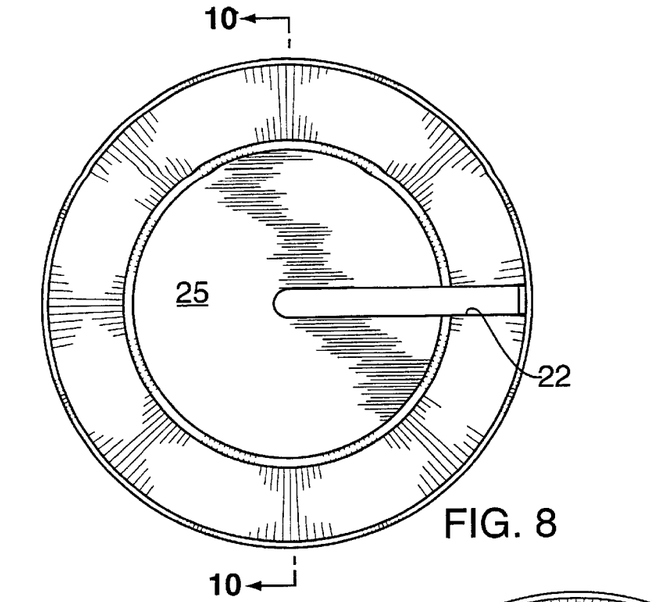
FIG. 8 is a front elevation view of the cover of the mount of FIG. 1.
Figure 9:
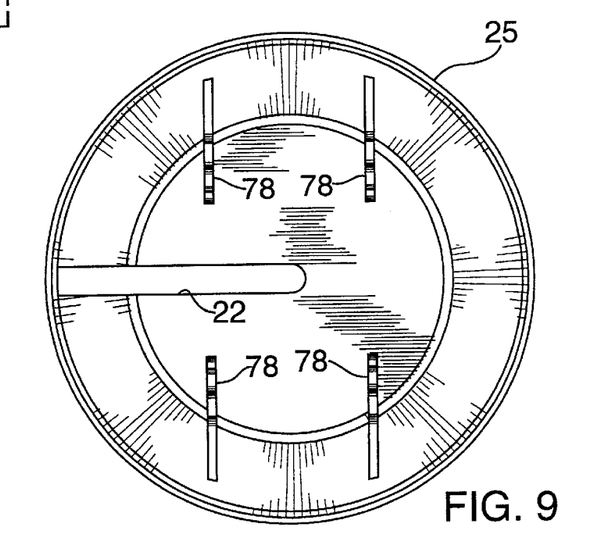
FIG. 9 is a back elevation view of the cover of FIG. 8.
Figure 10:
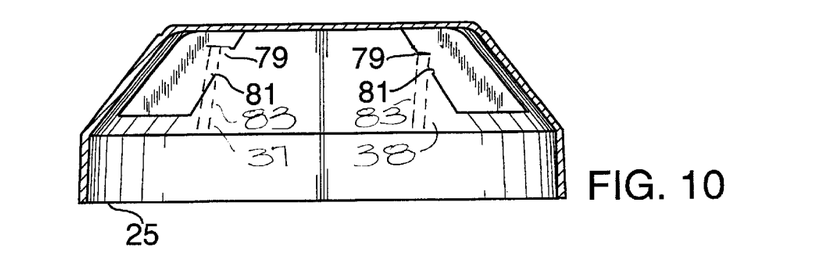
FIG. 10 is a cross-sectional view of the cover of FIG. 8 taken along the line 10—10 of FIG. 8.
Figures 11A, 11B:
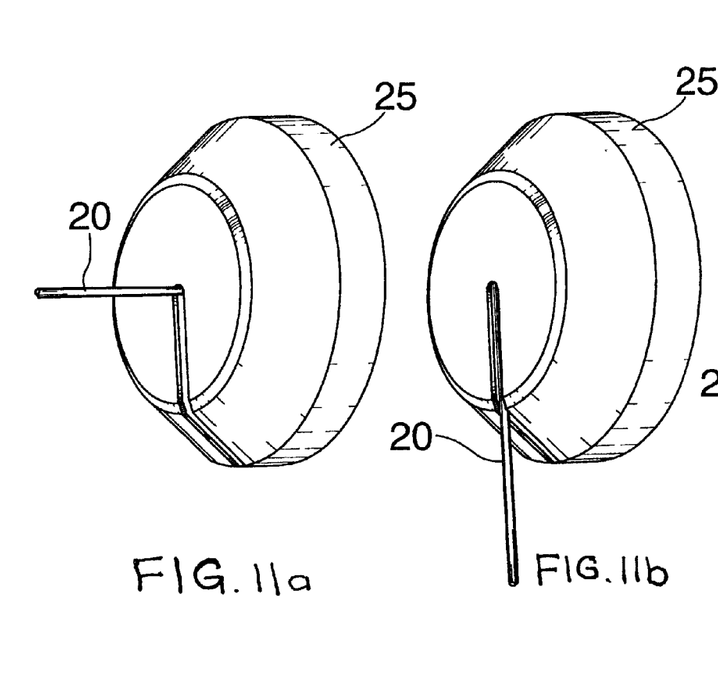
Figure 11C:
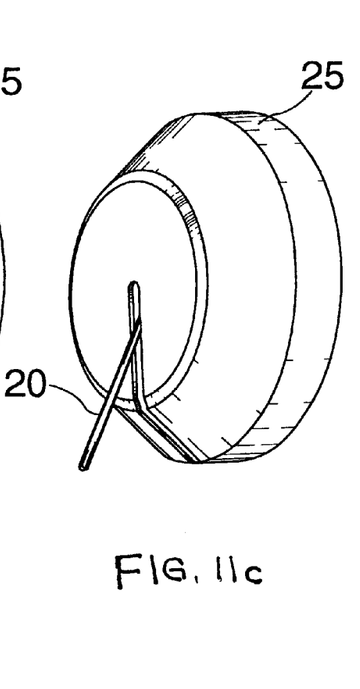
Figure 11D:
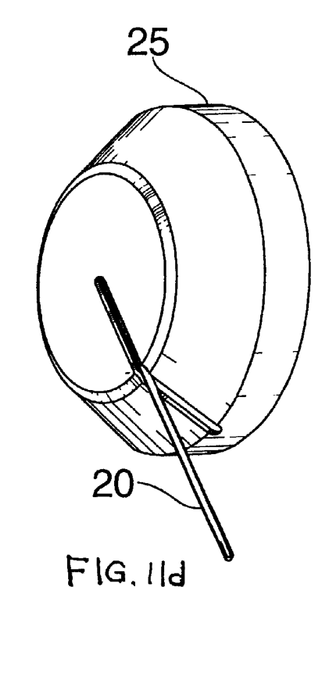

As shown in FIG. 1, a preferred shape of a cover 25 consists of an upper frustum 135 connected to a lower substantially cylindrical portion 125. A slot 22 in the cover 25 extends radially out from the center of a planar outer surface 130 of the frustum 135, along the inclined side portion of the frustum 135 and ends substantially at the boundary between the frustum 135 and the cylinder 125. The geometry of the slot and its relationship to the shaft 45 allow the cable 20 to extend out from substantially 0 degrees to 90 degrees relative to the surface 26 to which the mount is secured. The slot 22 is located in a plane substantially perpendicular to the axis of the shaft 45. The slot is aligned with the passage 48 in the shaft into which the cable extends. Extending perpendicular to the shaft, the cable is thus free to move with pivoting of the shaft without interference from the cover. Because the cover 25 is secured to the bracket 35 in fixed relation to the bracket, this remains true regardless of the angular position at which the bracket 35 is secured to the mounting surface 26. Thus, the single slot 22 can accommodate any desired angle of emergence of the cable 20. This is illustrated in FIGS. 11(a) to 11(d). As shown in FIGS. 8, 9 and 10, the cover 25 has four internal fingers 78. These are notched at 79 to form slight protrusions 81. The fingers 78 lodge in four holes 83 (FIG. 3) in the ears 37 and 38 of the mount 35 to retain the cover 25 in place. The arrangement of fingers 78 and holes 83 permit the cover to be mounted with the slot 22 extending in either of two positions 180° apart so that the cable 20 can be positioned at any angle within 180° with respect to the supporting surface. Other means of securing the cover 25 over the interior workings of the mount may readily be adopted.

The cable mounting apparatus of this invention can be constructed of any material of suitable strength and durability. The cable 20 of this cable mounting apparatus can be coated or bare. It may be a single strand of wire or multiple strands or it may be an elongate flexible member of any material of suitable strength. The cover 25 can be made out of any suitable plastic or metal for example. This invention is considered to encompass modifications of or adaptations to the disclosed embodiments as will be readily recognized by those of ordinary skill in the art.

While a preferred embodiment of the invention has been described, this is exemplary only. Alternative features and embodiments may be employed without departure from the spirit and scope of the invention as set forth in the appended claims.

What is claimed is:

1. An apparatus for anchoring a cable comprising:
    a) a bracket with a base for securing the bracket to a surface,
    b) means for attaching an end of a cable,
    c) means for pivotally connecting to the bracket the means for attaching, and
    d) a slotted cover, the slotted cover and the bracket having inter-engaging means for securing the slotted cover to the bracket, with a slot in the cover aligned with a connection of the cable to the means for attaching and permitting emergence of the cable at various angles from the interior of the cover without interference of the cover with the cable, the slotted cover at least substantially concealing the elements (a), (b) and (c), and whereby the means for attaching secures the cable end for extension of the cable away from the bracket at an angle adjustable with pivoting of the means for attaching.

2. An apparatus for anchoring a cable comprising:
    a) a bracket with a base for securing the bracket to a surface,
    b) means for attaching an end of a cable,
    c) means for pivotally connecting to the bracket the means for attaching, whereby the means for attaching secures the cable end for extension of the cable away from the bracket at an angle adjustable with pivoting of the means for attaching, and
    d) a slotted cover, the slotted cover and the bracket having inter-engaging means for securing the slotted cover to the bracket, with a slot in the cover aligned with a connection of the cable to the means for attaching and permitting emergence of the cable at various angles from the interior of the cover without interference of the cover with the cable, wherein the bracket is adapted to be angularly adjusted by partial rotation on the mounting surface to which it is secured, and wherein the bracket further comprises means for fixing the adjusted angular position at which the bracket is secured to the surface, wherein the means for securing the bracket to the surface comprises a central opening through the base for extension of a first fastener therethrough and into the surface, and the means for fixing the adjusted angular position comprises an arcuate slot centered on the opening for receipt of a second fastener therethrough into the surface, whereby the slot permits partial rotation of the bracket on the surface about the first fastener to be securely affixed by tightening the second fastener.

3. An apparatus for anchoring a cable comprising:
a) a bracket with a base for securing the bracket to a surface,
b) means for attaching an end of a cable,
c) means for pivotally connecting to the bracket the means for attaching, whereby the means for attaching secures the cable end for extension of the cable away from the bracket at an angle adjustable with pivoting of the means for attaching, and
d) a slotted cover, the slotted cover and the bracket having inter-engaging means for securing the slotted cover to the bracket, with a slot in the cover aligned with a connection of the cable to the means for attaching and permitting emergence of the cable at various angles from the interior of the cover without interference of the cover with the cable, wherein the bracket is adapted to be angularly adjusted by partial rotation on the mounting surface to which it is secured, and wherein the bracket further comprises means for fixing the adjusted angular position at which the bracket is secured to the surface, wherein the means for attaching an end of a cable includes a shaft pivotal about a longitudinal axis thereof, and means for fastening the cable end to the shaft with the cable extending outward from the shaft in a direction transverse to the longitudinal axis of the shaft and through the slot of the cover.

4. The apparatus of claim 3, wherein the means for fastening the cable end includes a first passage bored transversely through the shaft to receive the cable end, an anchor block having a further passage therethrough to receive the cable end where it emerges from the first passages, and means for securing the anchor block onto the cable end.

5. The apparatus according to claim 4, wherein the bracket is U-shaped, having a pair of generally perpendicular shaft support ears upstanding from the base, the ears supporting the shaft for pivotal movement.

6. An apparatus for anchoring a cable, such as a support cable, comprising:
a) a substantially U-shaped mounting bracket having two ears and a base, the base having a mounting hole and being disposed between two ears, each of the two ears having a shaft-receiving bearing;
b) a cable shaft with two ends, each end pivotally mounted within the shaft-receiving bearing and with at least one cable passage bored substantially transversely therethrough;
c) an anchor-block having at least one anchor-block passage with a set-screw passage extending from the surface of the anchor-block into the at least one anchor-block passage and a set-screw disposed within the set-screw passage; and
d) a cable with two ends, one end attached to the cable shaft by threading through the at least one cable passage, and through the at least one anchor-block passage, and by tightening the at least one set-screw, whereby the mounting hole of the base allows connection of the apparatus to a mounted-on surface and the cable shaft allows the angle between the cable and the mounted-on surface to adopt any angle, constrained only by the geometry of the immediate environment of the apparatus and the mounted-on surface.

7. The apparatus for anchoring a cable according to claim 6, wherein the shaft has a second passage bored substantially transversely therethrough, the anchor block having a second anchor-block passage bored therethrough, the cable end being reversed and threaded back through the second passage bored through the anchor-block and through the second passage bored through the shaft.

8. The apparatus of claim 7, wherein the anchor-block is substantially T-shaped with a cross-bar portion and a stem portion, the at least one anchor-block passage is bored through the stem portion, and the second anchor-block passage is bored through the cross-bar portion substantially parallel to the first anchor-block passage.

9. The apparatus of claim 8, wherein the anchor-block has at least one set-screw passage extending from the face of the anchor-block to, and intersecting with, a first anchor-block passage and at least one set-screw passage extending from the face of the anchor-block to, and intersecting with, the second anchor-block passage and the set-screw passages engage and contain set-screws, whereby the set-screws in the set-screw passages secure the cable.

10. The apparatus of claim 8, wherein the shaft has a flat seating the anchor-block.

11. The apparatus of claim 10, wherein the shaft is a bolt extending through holes in the ears and returned by a lock-nut.

12. The apparatus of claim 8, wherein the base includes an outward extending base portion having an arcuate slot for receiving a fastener.

13. The apparatus of claim 12, wherein the fastener is a mounting bolt, whereby the mounting bolt secures the base anywhere along the arcuate slot, allowing the apparatus to be secured in a range of angles with respect to a plane perpendicular to the mounted-on surface.

14. The apparatus of claim 8, further comprising cover-mounting holes in the ears and a slotted cover, the cover comprising a substantially cylindrical portion, a transition portion, a frustum, a slot, and internal fingers, wherein the substantially cylindrical portion is located at the bottom of the cover, the frustum is located at the top of the cover with the transition portion joining the substantially cylindrical and frustum portions, the slot extends radially out from the center of the frustum, along the inclined surface of the frustum and ending substantially at the transition portion, and wherein the interior fingers engage the cover mounting holes in the ears of the mount, whereby the cover substantially hides the mount, and the cable extends from the cable shaft through the slot at any angle between about 0 and 90 degrees to the mounted-on surface while the cover remains in place.

15. An apparatus for anchoring a cable comprising:
a) a means for securing an end of a cable;
b) a means for mounting for pivotal movement the means for securing, the pivotal movement being angular movement around an axis substantially perpendicular to a force directed along the cable;
c) means for connecting the means for mounting to a supporting surface; and
d) means for adjustably fixing an angular position at which the means for mounting is connected to the supporting surface, the means for mounting comprising a bracket containing two shaft-receiving holes, and the means for securing comprises a cable shaft with two ends, each end disposed in one of the shaft-receiving holes, the bracket being substantially U-shaped and having two ears, a base disposed between the ears and one of the shaft-receiving holes being located in each ear, the cable shaft containing at least one cable passage bored transversely of the cable shaft, substantially perpendicular to a longitudinal axis of the cable shaft, the means for securing further comprising an anchor-block having at least one anchor-block passage with at least one set-screw passage bored in the at least one anchor-block passage, extending from the surface of the anchor-block into the at least one anchor-block passage, and a set-screw disposed within the set-screw passage.

16. The apparatus of claim 15, wherein the cable shaft has a second cable passage, the anchor-block has a second anchor-block passage, and the end of the cable threads into and through the proximal end of one cable passage, into and through one of the anchor-block passages, loops around a portion of the anchor-block in frictional engagement therewith, threads into and through the distal end of the other anchor-block passage, threads into and through the other cable passage in the shaft and is secured by at least one set-screw in each of the anchor block passages.

17. An apparatus for anchoring a cable comprising:
a) a means for securing an end of a cable,
b) a means for mounting for pivotal movement the means for securing, the pivotal movement being angular movement around an axis substantially perpendicular to a force directed along the cable,
c) means for connecting the means for mounting to a supporting surface; and
d) means for adjustably fixing an angular position at which the means for mounting is connected to the supporting surface, the means for mounting comprising a bracket having a base, the means for connecting comprising a bolt and a hole in the base capable of accepting the bolts and the means for adjustably fixing comprising a mounting fastener and an arcuate slot for receiving therethrough the mounting fastener, whereby the mounting fastener engages and secures the base anywhere along the arcuate slot allowing the cable anchor to be secured at any of a range of angles with respect to a vertical plane perpendicular to the supporting surface.

18. An apparatus for anchoring a cable comprising:
a) a means for securing an end of a cable,
b) a means for mounting for pivotal movement the means for securing, the pivotal movement being angular movement around an axis substantially perpendicular to a force directed along the cable,
c) means for connecting the means for mounting to a supporting surface,
d) means for adjustably fixing an angular position at which the means for mounting is connected to the supporting surface, and
e) a slotted cover, wherein the means for mounting comprises a base disposed between two ears, and whereby the slotted cover substantially hides from view the means for securing, the means for mounting, the means for connecting, and the means for adjustably fixing.

19. The apparatus of claim 18, wherein the slotted cover comprises a substantially cylindrical portion, a transition portion, a frustum, a slot and internal fingers; the substantially cylindrical portion is located at the bottom of the cover, the frustum is located at the top of the cover, and the transition portion joins the cylindrical and frustum portions; the slot extends radially out from the center of the frustum, along the inclined surface of the frustum and ending substantially at the transition portion; the ears have holes that accept the internal finger, whereby the cover substantially hides the remainder of the cable anchor, and the cable extends from the cable shaft through the slot at any angle between substantially 0 and 90 degrees to the porting surface while the cover remains in place.

20. An apparatus for anchoring a cable comprising:
a) a means for securing an end of a cable,
b) a means for mounting for pivotal movement the means for securing, the pivotal movement being angular movement around an axis substantially perpendicular to a force directed along the cable,
c) means for connecting the means for mounting to a supporting surface, and
d) means for adjustably fixing an angular position at which the means for mounting is connected to the supporting surface, wherein the means for mounting comprises a bracket having a base and first and second fastener-receiving openings for securing the base stably to supporting structure at two points of attachment, and wherein the second opening comprises an arcuate slot centered on the first opening to permit angular adjustment of the bracket on a supporting structure.

21. The apparatus according to claim 1, wherein the slot in the cover substantially is a plane perpendicular to an axis about which the means for attaching an end of a cable is pivotal.

\* \* \* \* \*